United States Patent [19]
Fujita et al.

[11] Patent Number: 5,761,253
[45] Date of Patent: Jun. 2, 1998

[54] METHOD AND APPARATUS FOR SIGNAL TRANSMISSION

[75] Inventors: Yuzuru Fujita; Haruhiko Imada; Seiichi Kawashima, all of Hadano, Japan

[73] Assignee: Hitachi, Ltd., Tokyo, Japan

[21] Appl. No.: 268,410

[22] Filed: Jun. 30, 1994

[30] Foreign Application Priority Data

Jun. 30, 1993 [JP] Japan ................... 5-160693

[51] Int. Cl.$^6$ ................................................. H04L 7/00
[52] U.S. Cl. ........................ 375/354; 375/220; 327/141
[58] Field of Search ............................ 375/354, 362, 375/373, 377, 257, 219, 220; 327/141, 161; 370/83

[56] References Cited

U.S. PATENT DOCUMENTS

| | | | |
|---|---|---|---|
| 4,943,984 | 7/1990 | Pechanek et al. | 375/358 |
| 4,964,141 | 10/1990 | Matsushima et al. | 375/354 |
| 5,105,444 | 4/1992 | Gard | 375/372 |
| 5,323,125 | 6/1994 | Hiben et al. | 375/275 |

FOREIGN PATENT DOCUMENTS

| | | |
|---|---|---|
| 1181218 | 7/1978 | Japan . |
| 63-86980 | 4/1988 | Japan . |
| 233194 | 2/1990 | Japan . |
| 4291609 | 10/1992 | Japan . |
| 4307610 | 10/1992 | Japan . |
| 2256114 | 11/1992 | United Kingdom ........... 375/356 |

*Primary Examiner*—Temesghen Ghebretinsae
*Attorney, Agent, or Firm*—Jenner & Block

[57] ABSTRACT

A method and an apparatus for enabling a data signal to be transmitted stably at high speed over long distances without using thicker cables and without increasing physical quantities of such resources as transmitting-receiving circuit elements are disclosed. On the transmitting side, the phase of a clock signal relative to the data signal is modified in accordance with the distance between the transmitting and the receiving sides, the clock signal being transmitted along with the data signal. On the receiving side, the incoming data signal is received in synchronism with the received clock signal.

5 Claims, 6 Drawing Sheets

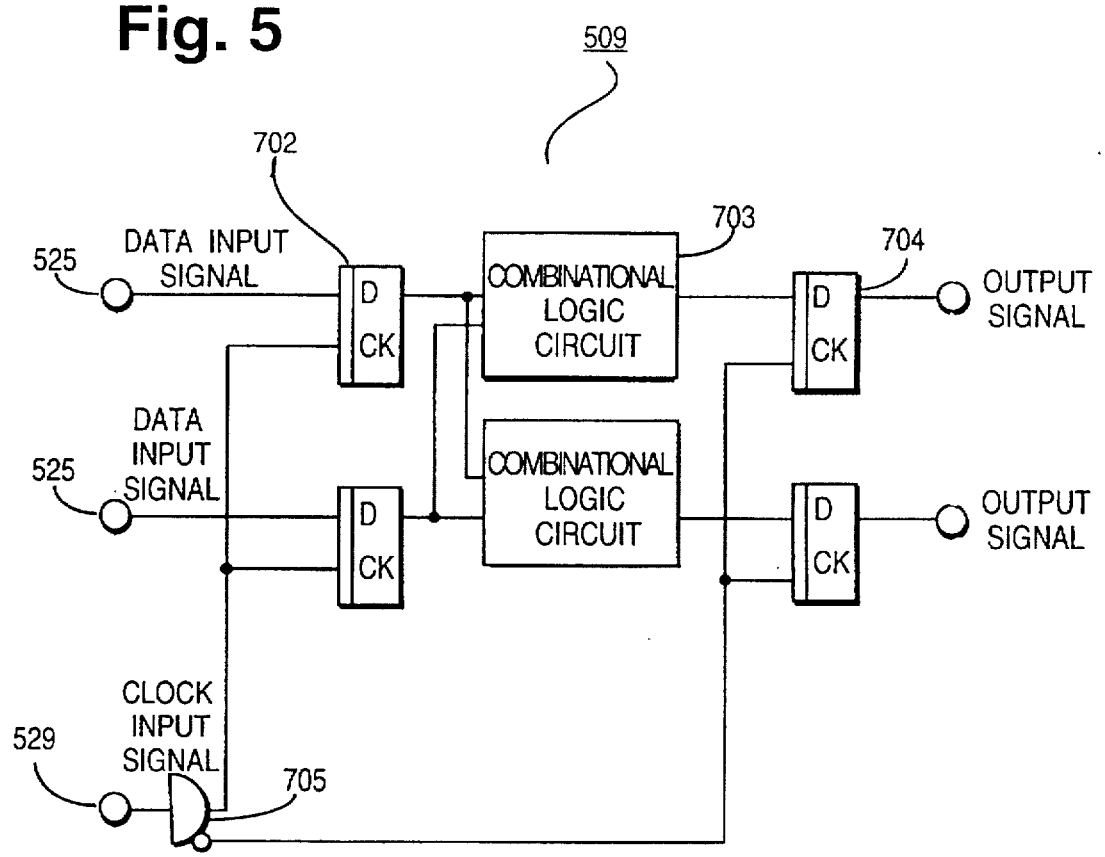

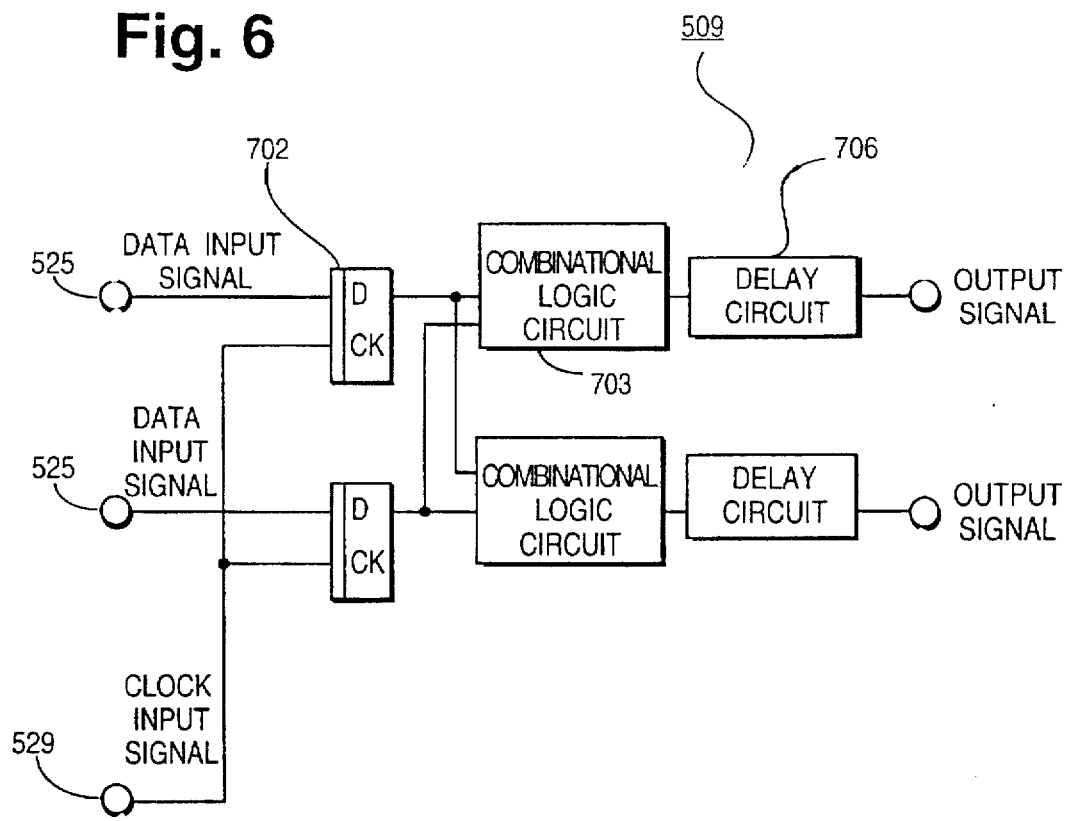
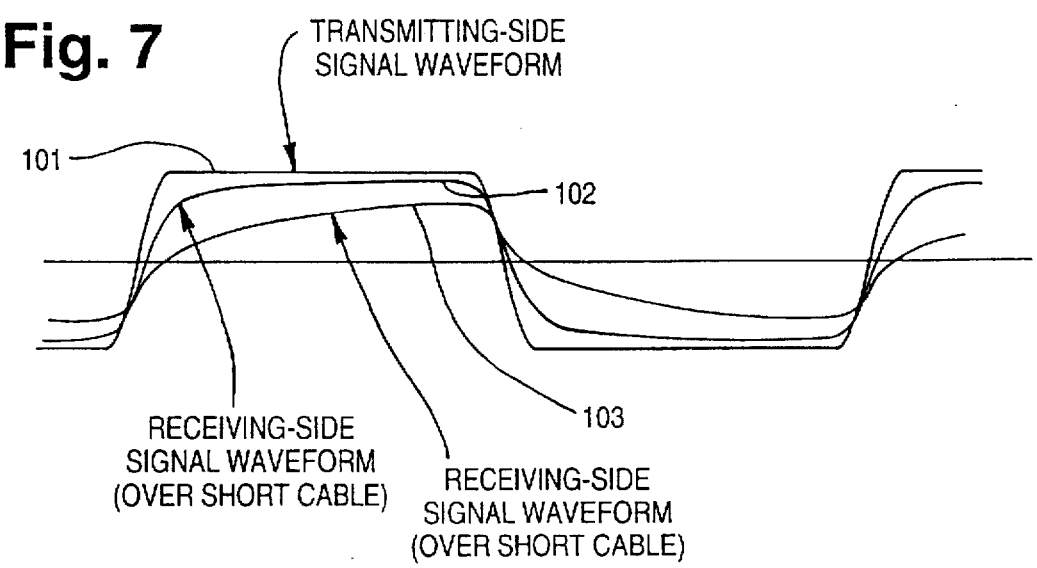

METHOD AND APPARATUS FOR SIGNAL TRANSMISSION

BACKGROUND OF THE INVENTION

1. Field of the invention

The present invention relates to a method and an apparatus for transmitting signals between electronic devices.

2. Description of the related art

Generally, coaxial cables are used when signals are transmitted at high speed between electronic devices. Where the distance between the transmitting and the receiving sides is extended, the waveform of a signal exchanged therebetween tends to be attenuated.

A transmitting-side signal waveform, while passing through cables, develops a waveform attenuation proportionate to the cable length involved. The waveform thus disturbed is bound to limit the distance over which signals may be transmitted.

The attenuation of the signal waveform is attributable to the so-called skin effect of cables. The conventional solutions to this problem are limited: either to use thicker cables, or to adopt a transmission scheme known as the differential transmission method.

To use thicker cables inevitably increases the volume and the weight of the cables involved. Another disadvantage of this approach is the higher cost of the cables.

The differential transmission method, when adopted to allow for certain degrees of waveform attenuation, doubles the amount of the signals exchanged. This requires increasing physical quantities of the cables, transmitting-receiving circuit elements, etc. The result is a bulkier equipment layout that also imposes heavier cost burdens.

A typical floor layout of a computer room may include, for example, large computers, a medium computer, a small computer, a supercomputer, a high-speed shared storage unit, a plurality of power supply units and a plurality of magnetic storage units. If the attenuation of the transmitted signal makes it impossible to adopt long transmission distances, all of the computers need to be located close to the high-speed shared storage unit. As a result, the number of computers that may be connected to the high-speed shared storage unit is limited.

In some cases, it may be desired to connect a certain computer to the shared storage unit at the expense of a lowered transmission speed for the computer. However, the distance of signal transmission cannot be extended even if the transmission speed is reduced. This is because the phase relationship between the data signal and the clock signal in synchronism therewith is conventionally fixed.

SUMMARY OF THE INVENTION

It is therefore an object of the present invention to provide a method and an apparatus for transmitting the data signal at high speed over long distances without the use of thicker cables and without the need to increase such physical resources as transmitting-receiving circuit elements.

To attain this object, the invention envisages a method and an apparatus for controlling, on the transmitting side, the phase of the clock signal relative to the data signal in accordance with the distance between the transmitting and the receiving sides, the clock signal being transmitted along with the data signal. On the receiving side, the incoming data signal is received in synchronism with the received clock signal.

BRIEF DESCRIPTION OF THE DRAWINGS

FIG. 5 shows a circuit diagram of a data signal receiving LSI according to the invention.

FIG. 6 shows a circuit diagram of an alternate data signal receiving LSI according to the invention.

FIG. 7 shows a view of signal waveforms indicating how signals attenuate depending on the cable length.

DESCRIPTION OF THE PREFERRED EMBODIMENT

Preferred embodiments of the invention will now be described in detail with reference to the accompanying drawings.

Figure 1:
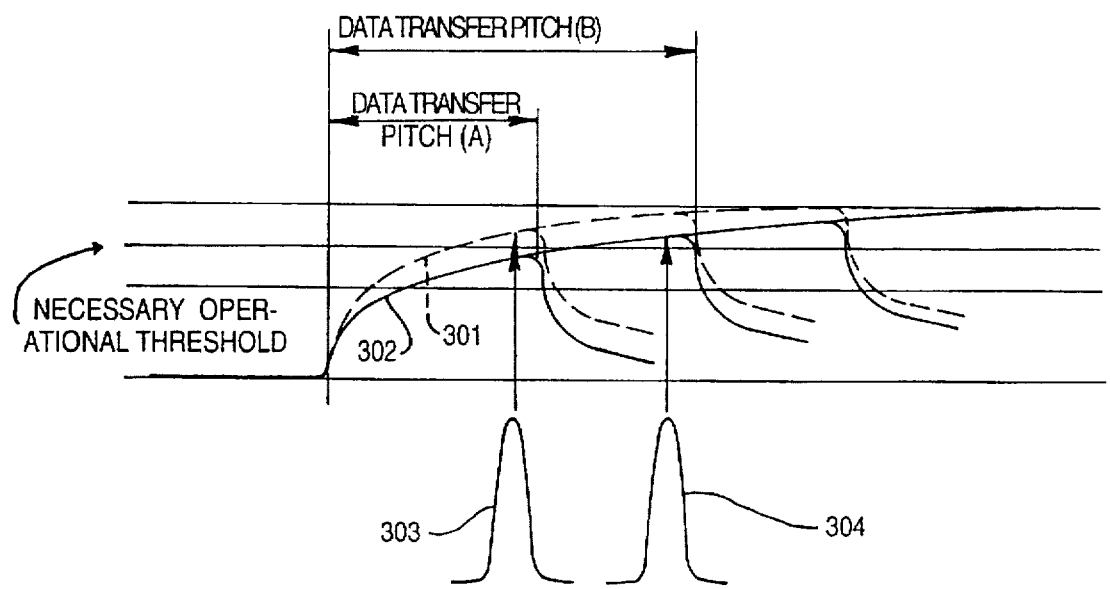
FIG. 1 shows a view of signal waveforms for explaining the function of the invention.

How the method and the apparatus of the invention work is outlined below with reference to FIG. 1 showing signal waveforms.

A data signal 301 that traveled over a short cable distance has a voltage level reaching a necessary operational threshold. On the other hand, a data signal 302 that traveled over a long cable distance has a voltage level that fails to reach that threshold.

As illustrated, the data signal 301 coming over the short cable distance is accurately received when accompanied by a clock signal 303. This is because the clock signal 303 has a data transfer pitch (A) that synchronizes with the timing of the data signal 301 having reached the necessary operational threshold of the voltage level.

By contrast, the data signal 302 coming over the long cable distance is not received accurately when accompanied by the clock signal 303. This is because the data signal 302 fails to reach the necessary operational threshold when admitted at the time the clock signal 303 is input. However, the data signal 302 may be received unfailingly if accompanied by a clock signal 304 having a data transfer pitch (B) of a lower transmission speed.

Thus by controlling the phase of the transmitted clock signal according to the distance between the transmitting and the receiving ends, it is possible to send data signals at high speed over long distances without the use of thicker cables or without the need to increase such physical resources as transmitting and receiving circuit elements.

As outlined with reference to FIG. 1, the signal transmitting method of the invention basically involves controlling, on the transmitting side, the phase of the clock signal relative to the data signal in accordance with the distance between the transmitting and the receiving sides, the clock signal being transmitted along with the data signal. On the receiving side, the incoming data signal is received in synchronism with the received clock signal.

Figure 2:
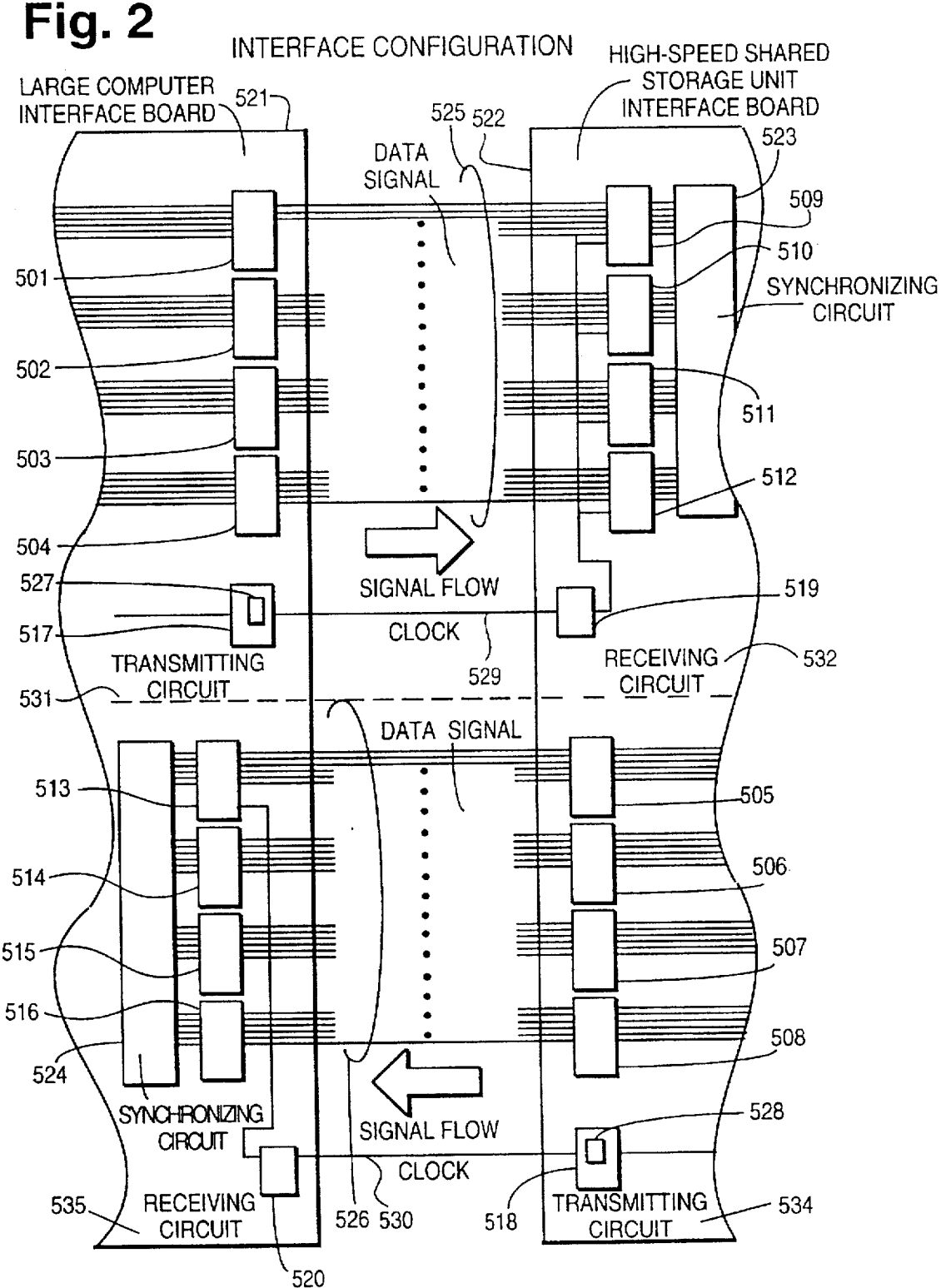
FIG. 2 shows an interface for signal transmission between electronic devices such as large computers and peripheral devices installed in a computer room in accordance with the invention.

FIG. 2 is a view showing an interface for signal transmission between electronic devices, the interface operating on the signal transmitting method according to the invention. The electronic devices are composed of a large computer interface board 521 and a high-speed shared storage unit interface board 522.

The interface board 521 comprises a transmitting circuit 531 and a receiving circuit 535; the interface board 522 includes a receiving circuit 532 and a transmitting circuit 534.

The transmitting circuit 531 on the large computer side comprises transmitting LSI's 501 through 504 for transmitting a data signal 525 and a clock transmitting LSI 517 for transmitting a clock signal 529. The receiving circuit 535 is constituted by receiving LSI's 513 through 516 for receiving a data signal 526, a clock receiving LSI 520 for receiving a clock signal 530, and a synchronizing circuit 524 for converting the data signal 526 input via the receiving LSI's 513 through 516 into a signal that synchronizes with the clock signal of the large computer.

Similarly, the transmitting circuit 534 on the side of the shared storage unit comprises transmitting LSI's 505 through 508 for transmitting the data signal 526 and a clock transmitting LSI 518 for transmitting the clock signal 530. The receiving circuit 532 includes receiving LSI's 509 through 512 for receiving the data signal 525, a clock receiving LSI 519 for receiving the clock signal 529, and a synchronizing circuit 523 for converting the data signal input via the receiving LSI's 509 through 512 into a signal synchronous with the clock signal of the shared data storage unit. Each bit of the data signals 525 and 526 is transmitted through a single line. Clock signals 529 and 530 are instead transmitted through differential transmission between LSI's 517 and 519 and between LSI's 520 and 518, respectively, so that the clock signal can arrive precisely on time to the other side.

Figure 3:
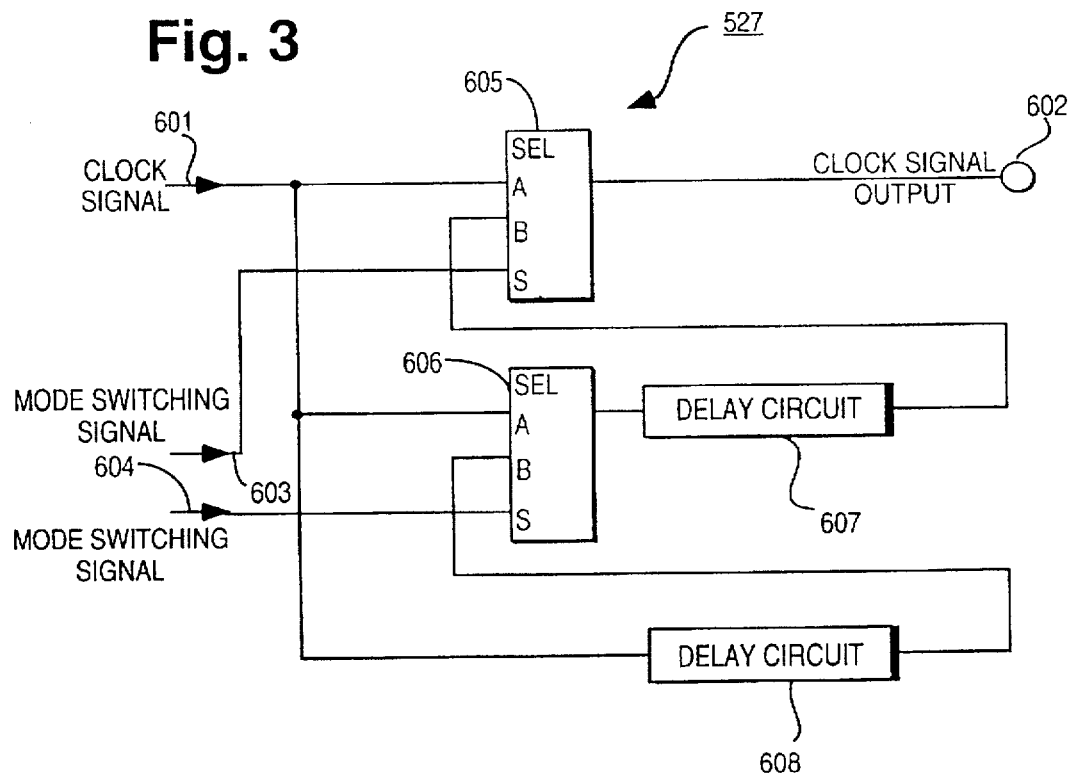
FIG. 3 shows a circuit diagram of a clock transmitting LSI according to the invention.

The clock transmitting LSI's 517 and 518 each include a variable delay circuit 527. A block diagram of the variable delay circuit 527 is shown in FIG. 3.

The variable delay circuit 527 comprises two selectors 605 and 606 and two delay circuits 607 and 608. In operation, mode switching signals 603 and 604 are used to delay the phase of a clock signal 601 before the latter is output.

Specifically, when the mode switching signals 603 and 604 are each set to 0, the clock signal 601 is output with its phase unchanged from an output terminal 602. When the mode switching signal 603 is set to 1 and the signal 604 is set to 0, the phase of the clock signal 601 is delayed by the amount of the delay time assigned to the delay circuit 607. When the mode switching signals 603 and 604 are both set to 1, the phase of the clock signal 601 is delayed by the combined delay times of the delay circuits 607 and 608. Overall, the clock signal is output with any one of the three different phases thus made available.

Each of the mode switching signals 603 and 604 is switched between logical 1 and logical 0 depending on the distance between the large computer interface board 521 and the high-speed shared storage unit interface board 522. More specifically, because the distance between the two interface boards 521 and 522 remains fixed after installation of the large computer and the high-speed shared storage unit, logical 1's and 0's of the mode switching signals are switched in accordance with the data transmission speed selected for data transmission between the large computer and the storage unit.

Suppose that the large computer interface board 521 now transmits the data signal 525 to the high-speed shared storage unit interface board 522. In that case, the signal transmission interface of the above-described configuration has the variable delay circuit 527 control the phase of the clock signal 529 in accordance with the data transmission speed defined between the two interface boards 521 and 522. With its phase thus varied, the clock signal 529 reaches the clock signal receiving LSI 519 of the high-speed shared storage unit interface board 522.

In turn, the clock signal receiving LSI 519 admits the incoming clock signal 529 as a timing signal with which the data receiving LSI's 509 through 512 receive the data signal.

The data receiving LSI's 509 through 512 receive the data signal 525 in synchronism with the clock signal 529 admitted as the timing signal for data reception. The data signal 525 thus received enters the synchronizing circuit 523. The synchronizing circuit 523 converts the received data signal into a data signal synchronous with an internal clock signal of the shared storage unit, and the data signal after conversion is handled by the shared storage unit.

The workings described above also apply to the case in which the high-speed shared storage unit interface board 522 transmits the data signal 526 to the large computer interface board 521.

When the receiving LSI's 509 through 512 or 513 through 516 receive the data signal 525 or 526, an attempt to forward the received data signal immediately to the next stage can result in error. That is, the immediately-forwarded signal can overlap as noise with the input to the adjacent receiving LSI, thus impeding the LSI from receiving the data signal correctly.

Figure 4:
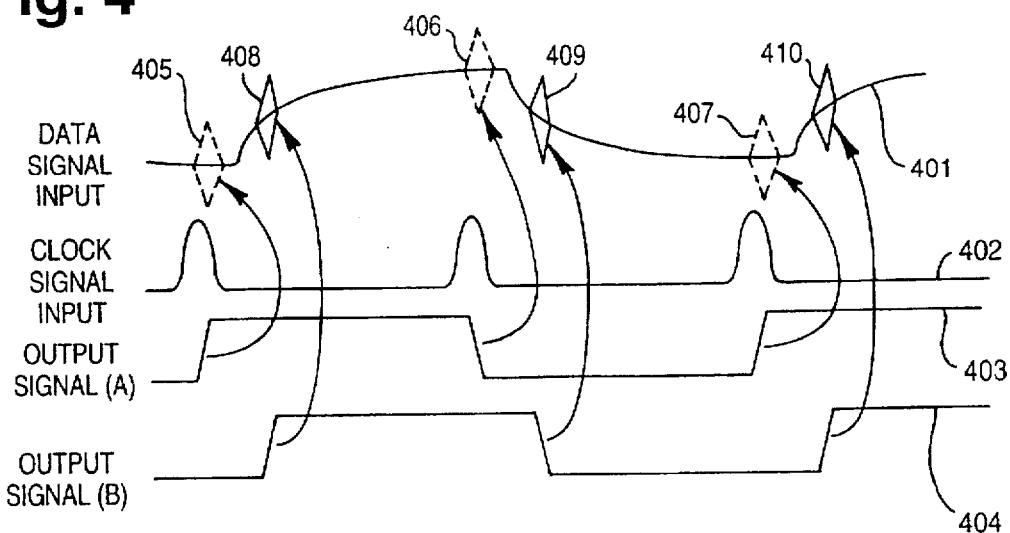
FIG. 4 shows a view of signal waveforms used to describe the reasons for delaying the output timing of the data signal according to the invention.

As showing in FIG. 4, if a data signal 401 admitted in synchronism with a clock signal 402 is immediately forwarded as an output signal 403, noise elements 405 and 406 stemming from the output signal 403 overlap with the input data signal 401. This disturbs the waveform of the data signal 401 in its strobe timing, raising the possibility that the data signal 401 may not be received correctly.

If the data signal output is delayed until the data signal 401 is entirely admitted, as in the case of the data signal 404 shown in FIG. 4, the noise elements 405 and 406 are shifted from the strobe timing. This provides an adequate operational margin for allowing the input data signal 401 to be received accurately.

FIG. 5 is a circuit diagram of the receiving LSI 509. The same internal configuration applies to the other receiving LSI's 510 through 516.

In FIG. 5, the data signal 525 input to the receiving LSI 509 reaches a signal-wise latch 702. The data signal 525 is then admitted into the latch 702 at a leading edge of the clock signal 529 input to an inverter-equipped buffer circuit 705.

The data signal admitted into the latch 702 is then processed by a combinational logic circuit 703. Past the circuit 703, the data signal reaches another latch 704 downstream.

The latch 704 receives the clock signal 529 that was inverted by the inverter-equipped buffer circuit 705. The latch 704 admits the data signal from the combinational logic circuit 703 at a leading edge of the inverted clock signal 529. From the latch 704, the output data signal is forwarded to the outside.

This means that when viewed from the input side of the receiving LSI 509, the data signal output from the latch 704 is delayed by the pulse width of the clock signal 529 before the delayed data signal is sent to the outside.

The workings above apply to the receiving LSI's 509 through 512 and 513 through 516. Operating in this manner, the receiving LSI's receive the input data signal unfailingly while preventing adverse effects of the noise as described with reference to FIG. 4. Thus the above configuration works very effectively when applied where the data signal has a relatively narrow amplitude.

The phase relationship between the data signal and the clock signal is determined so that the time required to switch from the clock signal to the next data signal will equal the sum of the delay time dispersion of the data signal, of the clock signal skew, and of the pulse width of the clock signal.

FIG. 6 is a circuit diagram of the receiving LSI 509, showing an alternative configuration thereof. This configuration also applies to the other receiving LSI's 510 through 516. The LSI 509 or any of the other receiving LSI's when structured in this manner causes a delay circuit 706 to delay the output signal of the combinational logic circuit 703 by a predetermined period before that signal is output. In this case, the delay time of the delay circuit 706 is slightly longer than the time required for the input data signal to be completely admitted into the latch 702. The configuration of FIG. 6 offers the same effects as that of FIG. 5.

Figure 8:
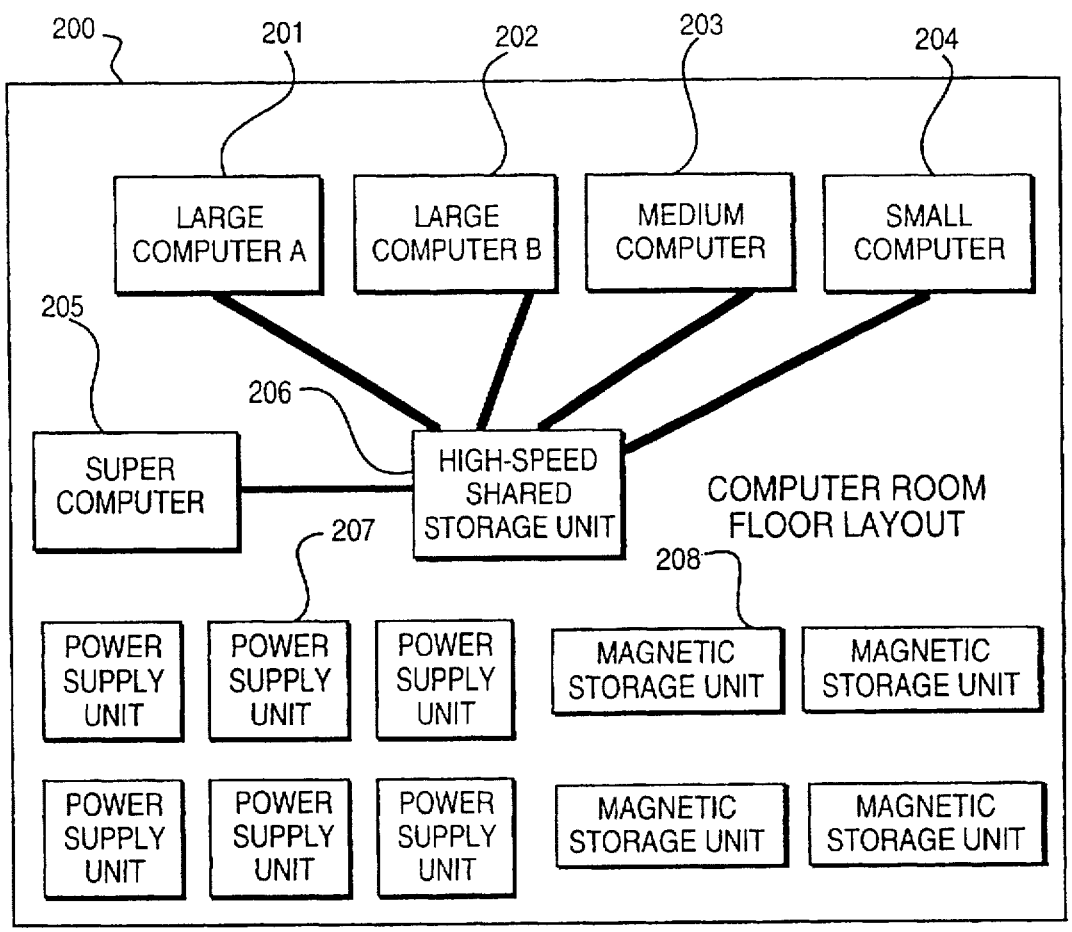
FIG. 8 shows a view of a typical floor layout of a computer room.

As described, the invention involves controlling on the transmitting side the phase of the clock signal relative to the data signal in accordance with the distance between the transmitting and the receiving sides, the clock signal being transmitted along with the data signal. On the receiving side, the incoming data signal is received in synchronism with the received clock signal. This makes it possible to transmit the data signal at a high speed pitch between devices which are located near each other and require a high rate data transmission. On the other hand, this makes it possible to transmit the data signal at a low speed pitch between apparatuses which are located farther away from each other and do not require a high rate data transmission. Therefore, the required data transmission rate can be attained without using thicker cables or without increasing the physical quantities of transmitting-receiving circuit elements or other resources.

Where the signal transmitting method of the invention is implemented, the floor layout of the computer room 200 of FIG. 8 may be rearranged as desired. Illustratively, the large computers 201 and 202 as well as the supercomputer 205 which require high rates of data transmission to and from the high-speed shared storage unit 206 are located near the storage unit 206; the medium and small computers 203 and 204 not requiring high data transmission rates may be located away from the storage unit 206, the transmission speed of the computers being made lower.

All that needs to be done is to control the phase of the clock signal in accordance with the transmission speed desired. This makes it possible to use the same interface board in dealing with different transmission speeds and different transmission distances.

In the examples described above, the phase of the clock signal is controlled in accordance with the transmission speed in question. Alternatively, when the computer system of FIG. 8 is started, a computer may be arranged to exchange with the high-speed shared storage unit 206 a data signal intended for measuring the actual delay time. When the actual delay time of the data signal is measured during the data exchange, the phase of the clock signal may be controlled automatically as per the delay time measurements thus taken and the data transmission pitch may also be determined in accordance with the measured delay for each device.

The alternative example above allows the data signal to be transmitted in a constantly stable manner regardless of the any change that may occur in the transmission characteristics of the cables used. This further boosts the reliability of the data transmission system.

As described, the invention controls on the transmitting side the phase of the clock signal relative to the data signal in accordance with the distance between the transmitting and the receiving sides, the clock signal being transmitted along with the data signal. On the receiving side, the incoming data signal is received in synchronism with the received clock signal. This makes it possible to stably transmit the data signal at high speed over long distances without the use of thicker cables and without the need to increase the physical quantities of transmitting-receiving circuit elements or other resources.

These benefits in turn contribute to increasing the degree of freedom in installing various electronic devices in the computer room or like setups.

We claim:

1. A signal transmitting method for transmitting a data signal in parallel from a transmitting side to a receiving side in synchronism with a clock signal, comprising the steps of:

controlling, on said transmitting side, the phase of said clock signal relative to said data signal in accordance with the distance between said transmitting side and said receiving side, said clock signal being transmitted along with said data signal;

receiving, on said receiving side, said data signal in synchronism with said clock signal: and forwarding said data signals; received by said receiving side to a next stage as output signals after a delay time so as to prevent errors resulting from noise.

2. A signal transmitting apparatus comprising:

means for transmitting a data signal in parallel from a transmitting side to a receiving side in synchronism with a clock signal;

phase controlling means on said transmitting side for controlling the phase of said clock signal relative to said data signal in accordance with the distance between said transmitting side and said receiving side, said clock signal being transmitted along with said data signal, and delaying means on said receiving side for delaying said data signals before forwarding them as output signals to a next stage so as to prevent errors resulting from noise.

3. A signal transmitting apparatus according to claim 2, further comprising a first latch circuit for inputting said data signal from the transmitting side at the timing of the clock signal.

4. A signal transmitting apparatus according to claim 3, wherein the delaying means comprises a second latch for outputting data produced in accordance with the inputted data signal at a timing of an inverted signal of the clock signal.

5. A signal transmission apparatus according to claim 2, wherein the controlling means comprises means for delaying the generated clock signal in several phases.

* * * * *